United States Patent [19]
Dittmeier

[11] Patent Number: 5,737,055
[45] Date of Patent: Apr. 7, 1998

[54] NOSEPIECE FOR EYEWEAR

[75] Inventor: Paul Dittmeier, San Francisco, Calif.

[73] Assignee: Bausch & Lomb Incorporated, Rochester, N.Y.

[21] Appl. No.: 701,289

[22] Filed: Aug. 22, 1996

[51] Int. Cl.$^6$ ................................................ G02C 5/12
[52] U.S. Cl. .................................. 351/138; 351/136
[58] Field of Search ...................................... 351/138, 136, 351/137, 139, 80, 65, 78, 79, 70, 41

[56] References Cited

U.S. PATENT DOCUMENTS

| | | | |
|---|---|---|---|
| 2,582,345 | 1/1952 | Moeller | 88/55 |
| 4,470,674 | 9/1984 | Piampiano | 351/136 |
| 4,670,915 | 6/1987 | Evans | 2/450 |
| 4,950,066 | 8/1990 | Hartman | 351/106 |
| 5,032,017 | 7/1991 | Bolle | 351/116 |
| 5,182,586 | 1/1993 | Bennato | 351/47 |
| 5,386,254 | 1/1995 | Kahaney | 351/6 |
| 5,390,369 | 2/1995 | Tubin | 2/12 |
| 5,526,069 | 6/1996 | Tseng | 351/86 |
| 5,594,511 | 1/1997 | Lin | 351/116 |

OTHER PUBLICATIONS

Advertisement for Adidas Eye Perfection in 20/20 Magazine, Nov. 1994, p. 142.

*Primary Examiner*—Hung X. Dang
*Attorney, Agent, or Firm*—Katherine McGuire

[57] ABSTRACT

A nosepiece for eyewear comprises a front half and back half which are formed of materials having different hardness values with the front half being harder than the back half. The nosepiece is of generally U-shaped configuration and is releasably attachable to the front of the eyewear by a plurality of bosses extending from the eyewear from in the vicinity of the bridge, and a like number of holes formed in the nosepiece such that the nosepiece may be snap-fit to the eyewear front. The hardness of the front half coupled with the attachment means provides for a very secure attachment of the nosepiece to the front, while the softness of the back half provides for a comfortable fit upon the face, while also providing cushioning against impacts to the face while the eyewear is worn. The overall configuration of the nosepiece coupled with its method of attachment provides optimum aesthetics in that there is no bulky appearance from the front as is a common problem with many replaceable nosepiece designs today.

9 Claims, 2 Drawing Sheets

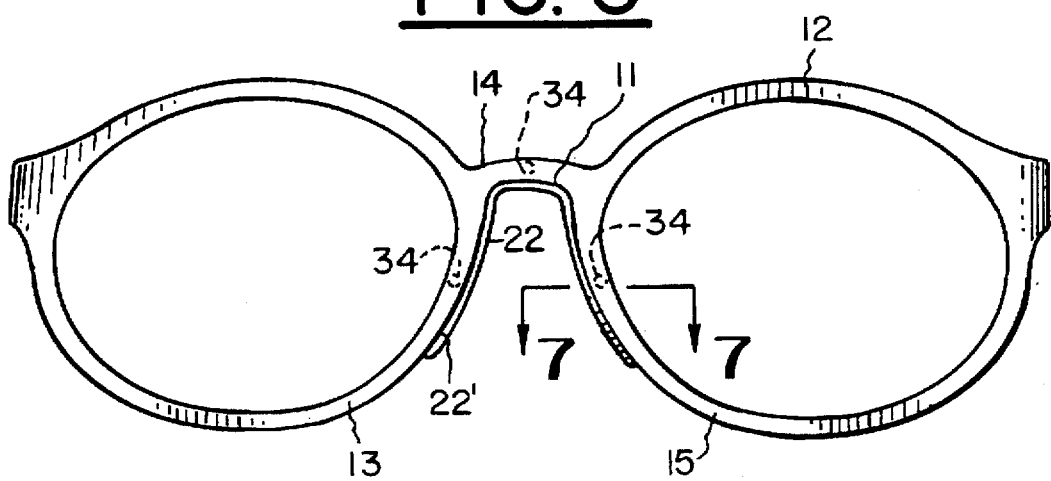
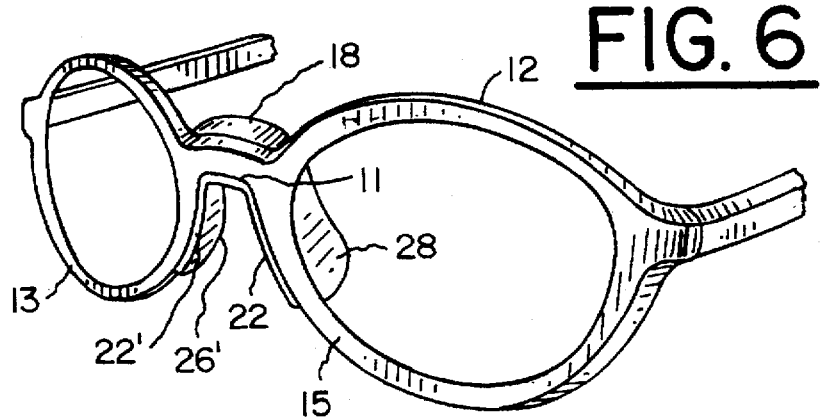
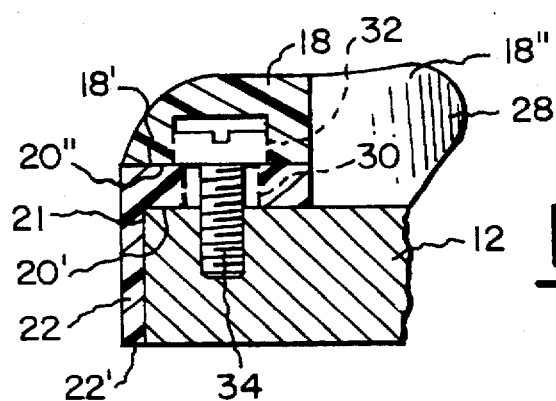

NOSEPIECE FOR EYEWEAR

BACKGROUND OF THE INVENTION

The present invention relates to nosepiece components for eyewear.

Nosepieces for eyewear are placed adjacent the bridge area for making contact with the wearer's nose to support the eyewear on the face. The nosepiece may be comprised of two separate nose pads, usually plastic or an elastomeric material, which are attached to small, bent wires brazed onto the eyewires which surround the lenses, respectively. In many plastic frame styles, the nose pads are formed integrally with the front frame. Lastly, nosepieces of unitary construction are available, some being removable and replaceable with other nosepieces on the eyewear by the user. Examples of this latter type of nosepiece construction may be seen in the following patents:

U.S. Pat. No. 2,582,345 issued to Moeller on Jan. 15, 1952
U.S. Pat. No. 4,670,915 issued to Evans on Jun. 9, 1987
U.S. Pat. No. 5,032,017 issued to Bolle et al on Jul. 16, 1991
U.S. Pat. No. 5,182,586 issued to Bennato on Jan. 26, 1993

As may be seen in the above patents, the unitary type of nosepiece is usually of U-shaped construction, and is typically made from a resilient type of material. A groove is formed in the outer surface of the nosepiece for pressing the nosepiece into place in a complementary-shaped recess in the eyewear front. As such, many of the designs permit the consumer to replace the nosepiece as needed, for example, when switching between different lens types on the frame. Unfortunately, many problems have been associated with this type of nosepiece, such as loosening and accidental dislodgment of the nosepiece from the eyewear front. Other concerns are proper fit of the nosepiece upon the face and protection against impacts to the eyewear while on the face. Lastly, aesthetics is always a concern, and the unitary types of nosepieces, while convenient in other respects, tend to have a bulky, heavy appearance when viewed from the front.

SUMMARY OF THE INVENTION

The present invention addresses the above-noted deficiencies of prior art nosepieces by providing a nosepiece of U-shaped construction which is comprised of two separate materials having different hardness values. The harder material component forms the front half of the nosepiece which attaches directly to the eyewear frame, and the softer material, which preferably has a resilient quality, forms the back half of the nosepiece and makes contact with the user's face when the eyewear is worn.

More particularly, the front half of the nosepiece includes a front wall which has a plurality of bore holes formed therein. An even number of bosses are fixed to the eyewear front in the area of the bridge which may be aligned with the holes in the front wall of the nosepiece. As such, the nosepiece may be snap-fit to the eyewear front in a detachable yet secure manner, thereby permitting interchangeability and replacement of the nosepiece on the same or different frame. The back, softer half of the nosepiece is fixed to the front half by an adhesive, for example. Alternatively, a two-shot molding process may be employed to form a unitary nosepiece comprised of the two materials which are molecularly bonded together.

BRIEF DESCRIPTION OF THE DRAWING

FIG. 5 is a front, elevational view of an eyewear front with attached nosepiece;

FIG. 6 is a perspective view of FIG. 5; and

FIG. 7 is a cross-sectional view taken through a boss on the front frame, generally along the line 7—7 in FIG. 5.

DETAILED DESCRIPTION

Figure 1:
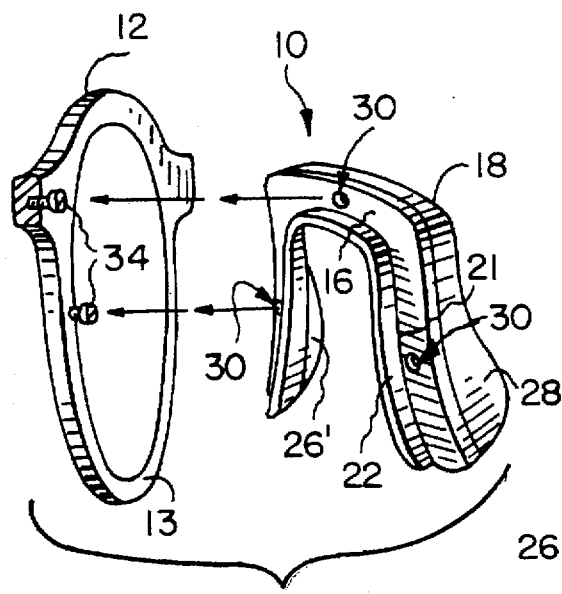
FIG. 1 is a perspective view of the nosepiece shown spaced from an eyewear front (fragmented)
Figure 3:
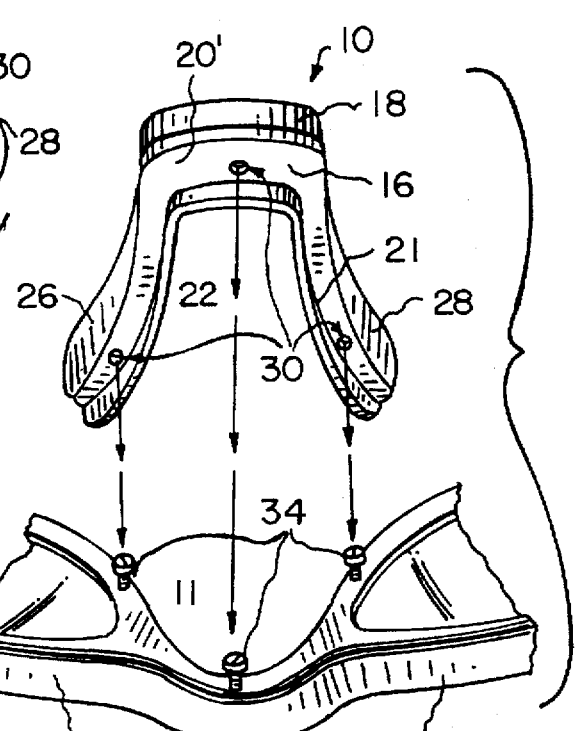
FIG. 3 is a perspective view from the top showing the manner of attaching the nosepiece to the bridge area of an eyewear front.

Referring now to the drawing, there is seen in the various Figures a nosepiece 10 for attaching to an eyewear front such as front 12 which includes a bridge 14. It is within the scope of the invention that nosepiece 10 may be used with other eyewear front types, for example fronts having no separate frame such as a wrap-style unitary lens. The term "front" therefore would include a unitary lens.

Figure 2:
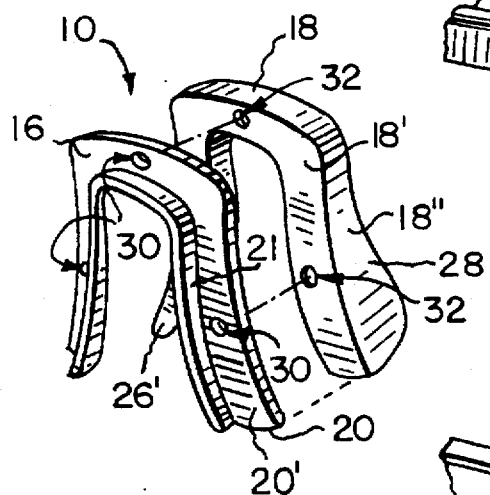
FIG. 2 is an exploded, perspective view of the nosepiece.
Figure 4:
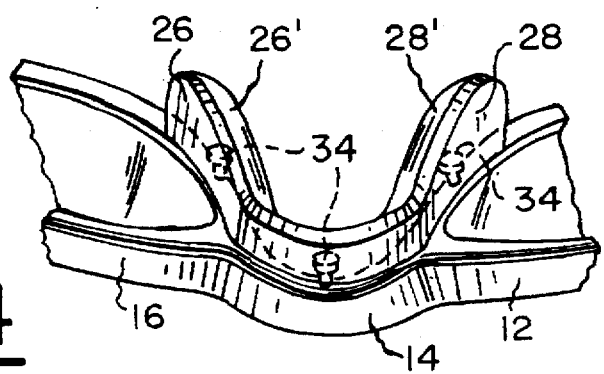
FIG. 4 is the view of FIG. 3 showing the nosepiece in the attached position.

Nosepiece 10 is comprised of an inverted, generally U-shaped front portion 16 and inverted U-shaped back portion 18 (shown separated in FIG. 2) which are fixed together in overlying relationship to form an integral, unitary nosepiece 10. Front portion 16 attaches directly to the eyewear front 12 while the back portion 18 rests against the wearer's nose to support the eyewear on the face. The front and back portions are made from materials having different hardness values, with the front portion being harder than the back portion. In the preferred embodiment, the front portion 16 is made from a harder plastic than back half 18, for example urethane, nylon, polycarbonate and acrylic butadiene rubber. The back portion 18 is made from a softer, and preferably resilient material such as an elastomeric material, e.g., styrene butadiene rubber, butyl rubber, urethane and co-polyesters. It is possible that front half 16 and back half 18 are formed from the same material with different hardness values, for example a hard urethane for front half 16 and a soft urethane for back half 18. A popular trademarked urethane which is available in different hardness values is MEGOL manufactured by Alphia Plastics of Italy. While the front half 16 is hard, the back half is softer with a preferred hardness value in the range of about 15 to 90 durometer rating on the A scale.

The front and back portions 16 and 18 may be fixed together with an adhesive, for example. Alternatively, front and back portions can be made using a two-shot molding process which would be especially advantageous if the same material is used for both front half 16 and back half 18, albeit with different hardness values (e.g., MEGOL). The hardness of front piece 14 coupled with the softness of back half 18 affords a strong and durable nosepiece having a strong point of attachment to the eyewear front, while also providing a very comfortable feel upon the face, as well as a degree of protection against impacts against the face.

Front half 16 is seen to include a first wall portion 20 having a front surface 20' and rear surface 20" (FIG. 7). A second wall portion 22 integrally extends generally perpendicularly from the inside edge 21 of first wall portion 20. Back half 18, shaped complementary to front half 16, includes a front wall 18' which lies in overlapping relationship to rear surface 20" of front half 20. Back half 18 further includes a ranged wall 18" which extends generally perpendicularly rearwardly from front wall 18' to form right and left legs 26 and 28, the facing surfaces 26' and 28' of which sit and rest on either side of the user's nose when the eyewear is worn. The generally U-shaped configuration of front and back half 16 and 18 is intended to provide a comfortable fit upon the user's face; however, it is understood that variations from the generally U-shaped configuration shown herein are within the scope of the invention. It is noted that the U-shaped configuration of the nosepiece shown is not a perfect "U" shape, but rather legs 26 and 28 flare outwardly toward the free ends thereof.

As seen best in FIGS. 1–4 and 7, nosepiece 10 is provided with a plurality of bore holes 30 formed in spaced relation about first wall portion 20 of front half 16, and holes 32 formed in front wall 18' of back half 18 which align with holes 30 in front half 16. Holes 30 extend entirely through front half 16 while holes 32 extend only part-way through back half 18 such that they are not visible from the rear. A like number of bosses 34 (e.g., screws) are provided on eyewear front 12 in the vicinity of bridge 14 which align with holes 30 on nosepiece 10. Nosepiece 10 may thus be releasably attached to eyewear front 12 by passing holes 30 over bosses 34. As seen in FIG. 7, the head 34' of screw 34 extends within back half 18 with the size of hole 30 being slightly smaller than the diameter of the screw head and hole 32 such that screw head 34' is snap fit through hole 30 and a respective hole 32. As such, nosepiece 10 is securely yet releasably mounted to eyewear front 12.

As seen in FIGS. 4–7, legs 26 and 28 of nosepiece 10 extend closely along eyes 13 and 15 of front 12, respectively, with second wall 22 extending forwardly in abutting relationship along the inside edge 11 of bridge 14 and part of eyes 13 and 15 such that only the front edge 22' of wall 22 of nosepiece 10 is visible from the front of the eyewear as seen best FIG. 5. Also, although only three holes and bosses are shown for attaching the nosepiece to the front, any number of holes and bosses may be used which will depend on the overall nosepiece and front shape.

What is claimed is:

1. A nosepiece for attaching to an eyewear front having opposite forward and rearward facing surfaces, said nosepiece comprising:

a) a front half of generally U-shaped configuration, said front half having a first wall portion having opposite front and back wall surfaces and an inside edge, said front half further including a second wall portion which extends generally perpendicularly to said first wall portion along said inside edge thereof, said second wall portion having having a front edge;

b) a back half of generally U-shaped configuration having opposite front and back wall surfaces, said back half front surface being fixedly attached in overlying, aligned relation to said front halfback surface, said front half and said back half being formed from materials having different hardness values with said front half being harder than said back half, and c) means for releasably attaching said nosepiece to said eyewear front with said front half front wall abutting said rearward facing surface of said eyewear front and said front edge of said second wall portion lying substantially flush with said forward facing surface of said eyewear front whereby only said front edge of said second wall portion is visible at said forward facing surface of said eyewear front.

2. The nosepiece of claim 1, wherein said nosepiece attaching means comprises a plurality of holes formed in spaced relation about said front wall surface of said front half, and a like plurality of bosses extending from said eyewear front which align with said plurality of holes in said front half.

3. The nosepiece of claim 2 wherein said plurality of holes extend entirely through said front half, and further including a plurality of holes formed in said front wall surface of said back half which align with said holes in said front half.

4. The nosepiece of claim 1 wherein said back half includes right and left legs which each include an inner surface for lying against the nose of a user of said eyewear.

5. The nosepiece of claim 1 wherein said back half has a hardness value in the range of about 15 to 90 durometer A.

6. The nosepiece of claim 1 wherein said front half is formed from a material selected from the group of materials consisting of:

nylon;

urethane;

polycarbonate; and acrylic butadiene rubber.

7. The nosepiece of claim 1 wherein said back half is formed from a material selected from the group of materials consisting of:

styrene butadiene rubber;

butyl rubber;

urethane; and co-polyesters.

8. The nosepiece according to claim 1 wherein said front half and said back half are formed from the same material with different hardness values for said front half and said back half.

9. The nosepiece of claim 8 wherein said material is urethane.

* * * * *